United States Patent [19]
Sonobe et al.

[11] Patent Number: 4,632,536
[45] Date of Patent: Dec. 30, 1986

[54] COPYING APPARATUS AND AN OPTICAL ASSEMBLY USABLE THEREWITH

[75] Inventors: Hiraku Sonobe, Yokohama; Hiroyuki Miyake, Kawasaki; Akihiro Kashiwabara, Yokohama, all of Japan

[73] Assignee: Canon Kabushiki Kaisha, Tokyo, Japan

[21] Appl. No.: 658,607

[22] Filed: Oct. 9, 1984

[30] Foreign Application Priority Data

Oct. 11, 1983 [JP] Japan .............................. 58-188339
Oct. 11, 1983 [JP] Japan .............................. 58-188340

[51] Int. Cl.⁴ ..................... G03G 15/00; G03B 27/52
[52] U.S. Cl. ............................... 355/3 R; 355/1; 355/55
[58] Field of Search ............... 355/1, 3 R, 8, 55, 59, 355/14 E; 350/257; 354/195.12, 286

[56] References Cited
U.S. PATENT DOCUMENTS

| | | | |
|---|---|---|---|
| 4,168,900 | 9/1979 | Adachi | 355/1 |
| 4,331,380 | 5/1982 | Rees et al. | 355/1 X |
| 4,394,083 | 7/1983 | Rees | 355/1 |
| 4,405,207 | 9/1983 | Kay | 350/320 |
| 4,542,983 | 9/1985 | Zambelli et al. | 355/55 |

*Primary Examiner*—Arthur T. Grimley
*Assistant Examiner*—C. Romano
*Attorney, Agent, or Firm*—Fitzpatrick, Cella, Harper & Scinto

[57] ABSTRACT

An optical assembly for forming an image of the original to be copied on a photosensitive member at a selected magnification, is detachably mounted in a copying apparatus. The optical assembly includes a number of small imaging elements which are arranged in a row or rows in the direction crossing the optical axes of the imaging elements. The copying apparatus is provided with a detector for detecting the imaging magnification of the optical assembly mounted in the copying apparatus. The optical assembly provided with a portion actable on the detector.

15 Claims, 26 Drawing Figures

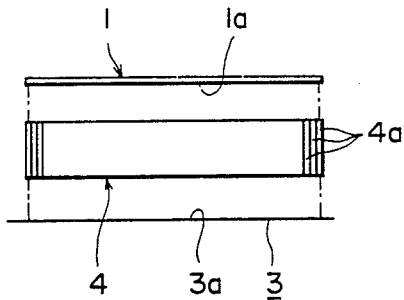
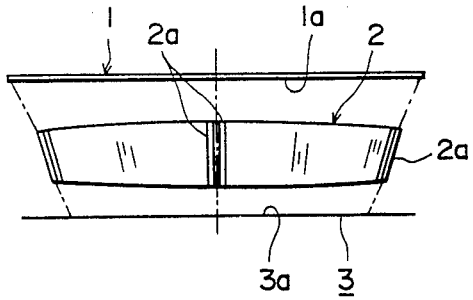
FIG. IA
(Prior Art)
FIG. IB
(Prior Art)
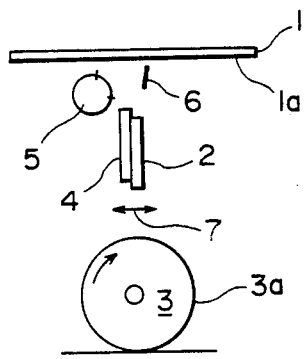
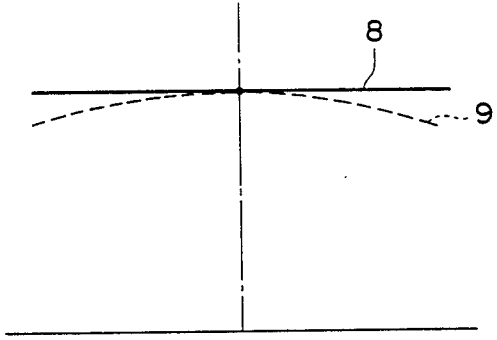
FIG. 2
(Prior Art)
FIG. 3
(Distributions of Illumination)

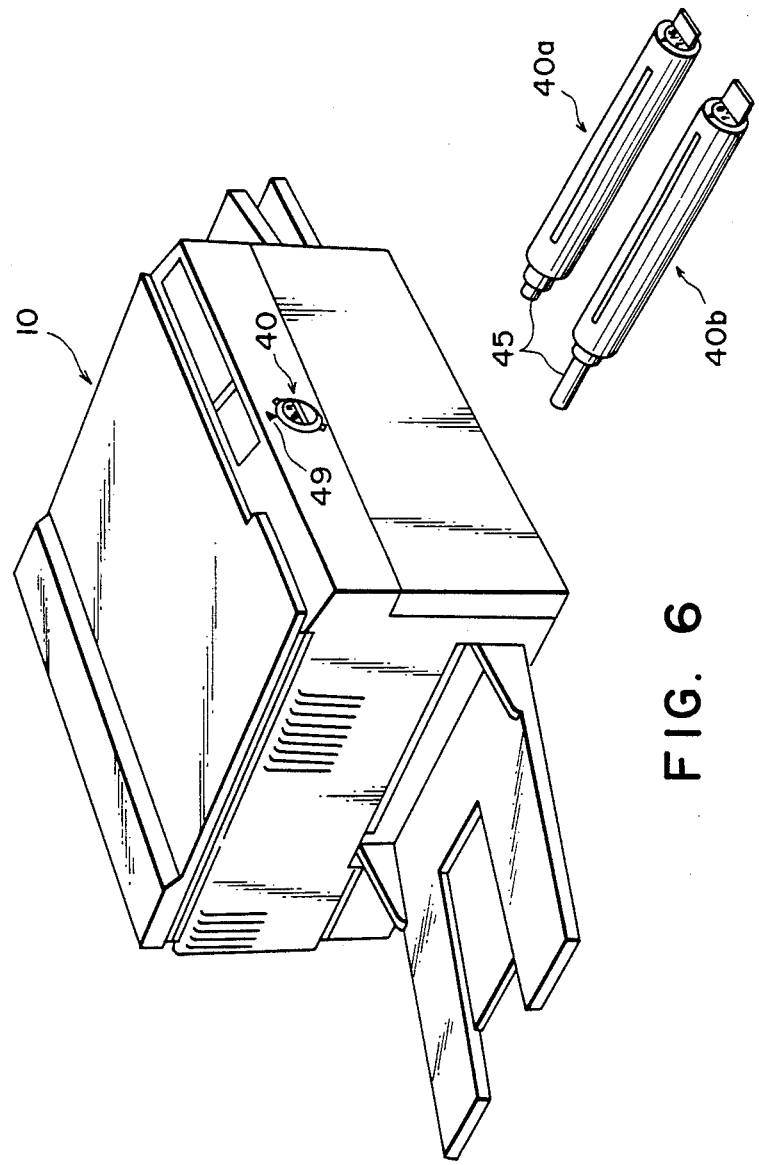

COPYING APPARATUS AND AN OPTICAL ASSEMBLY USABLE THEREWITH

BACKGROUND OF THE INVENTION

The present invention relates to a copying apparatus and an optical assembly usable therewith, wherein an optical member is used for imaging an original to be copied on a photosensitive member, which optical member comprises a plurality of small imaging elements arranged in the direction crossing the optical axes of the elements.

Generally, an array or arrays of a number of small-diameter bar-like imaging elements or bar lenses arranged in a direction transverse with thee optical axes thereof (hereinafter called a small-diameter imaging element array or imaging element array) is designed to form an image of an original at a unit magnification, the small-diameter bar-like imaging elements being known, for example, as "SELFOC" (trandemark, available from Nippon Ita Garasu Kabushiki Kaisha, Japan) which is used in a copying apparatus as imaging means and has a parabolic refractive index distribution decreasing radially outwardly and is effective to transmit the incident light in a wave-like fashion. FIG. 1A illustrates an example of a unit magnification imaging element array 4 used with a copying apparatus. The imaging element array 4 consists of a number of imaging elements 4a which are arranged parallel as a unit, and each of which is effective to form an image at a unit magnification. The imaging element array 4 is disposed equidistant from the information surface 1a of the original 1 and the photosensitive surface 3a of the photosensitive drum 3 so as to form an image of the original surface 1a onto the photosensitive surface 3a at a unit magnification.

Japanese Laid-Open Patent Application No. 16415/1982, corresponding to U.S. Pat. No. 4331380, discloses an imaging element array for forming a reduced or enlarged image. FIG. 1B illustrates an imaging element array 2 for reduction, disclosed in the Japanese Patent Application. The imaging element array 2 consists of a number of imaging elements 2a, each of which is effective to form a reduced image. The central imaging element in the imaging element array is positioned substantially perpendicular to the original surface 1a and to the photosensitive surface 3a. The other imaging elements are arranged in a fan-like fashion so that the elements are inclined more as the distance from the central imaging elements increases. In the arrangement of this Figure, the imaging element array 4 is offset toward the photosensitive surface 3a in consideration of the imaging distance, so that a reduced image of the original surface 1a is formed on the photosensitive surface 3a. If the imaging element array 2 is positioned upsidedown, and if it is offset toward the original surface 1a, an enlarged image of the original can be formed on the photosensitive surface 3a. The imaging element arrays are also disclosed in U.S. Pat. No. 4,405,207. Additionally, an example of a reduction imaging element array is disclosed in U.S. Pat. No. 4,168,900, which uses bar lenses as the imaging elements.

It has been proposed, in U.S. Pat. Nos. 4,331,380, 4,394,083, for example, to equip an image forming apparatus with a plurality of imaging element arrays which are for unit magnification, reduction or enlargement image formation as described above, so as to make it perform a variable magnification projection. FIG. 2 shows an example thereof, wherein a reduction imaging element array 2 and a unit magnification imaging element array 4 are juxtaposed integrally movable below the original document surface 1a. Below those element arrays, a photosensitive drum 3 is dispoesd. At a suitable position adjacent to the imaging element arrays 2 and 4, there is provided a fluorescent lamp 5 and an auxiliary reflection mirror 6 for reflecting the illumination light emitted by the fluorescent lamp 5. The imaging magnification can be switched between the unit magnification and the reduction by translating integrally the imaging element arrays 2 and 4 in the direction shown by an arrow 7.

The following problems arise in this apparatus. Firstly, it necessarily requires a driving mechanism for switching the positions of the imaging element arrays and a space for accommodating the imaging element array not being used. This is in contradiction to the fundamental purpose of the use of imaging element arrays, that is, to reduce the size of the exposure device. Secondly, the number of the magnification variation is determined by the number of the built-in imaging element arrays, so that the number can not be increased unless a large space is given for the non-used imaging element arrays. Thirdly, the switching mechanism mentioned above is complicated so as to increase the cost of the apparatus.

The prior art also teaches another structure in which the two imaging element arrays are fixed, and a shutter is moved under the arrays to switch the imaging element arrays to be used. However, this also requires a complicated mechanism to move the shutter. In addition, since the imaging element arrays are fixed, the apparatus is required to be bulky if the number of usable magnifications is increased. Furthermore, since those positions on the original surface or on the photosensitive surface which are faced by the two imaging element arrays, are different, the illumination of the original has to be made at a high intensity and over a broad area, or it makes difficult the use of a small diameter drum as the photosensitive member, or it makes difficult the increased number of usable magnifications.

SUMMARY OF THE INVENTION

Accordingly, it is a primary object of the present invention to provide a copying apparatus of a simple structure using small-diameter imaging element arrays, each of which has a selected imaging magnification.

It is another object of the present invention to provide a copying apparatus of small size using small-diameter imaging element arrays, each of which has a selected imaging magnification.

It is a further object of the present invention to provide a small size copying apparatus capable of a greater number of imaging magnifications, using small-diameter imaging element arrays.

It is a further object of the present invention to provide an interchangeable optical assembly for a small size copying apparatus.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A illustrates a part of a copying apparatus using an imaging element array for a unit magnification.

FIG. 1B illustrates a part of a copying apparatus using an imaging element array for reduction.

FIG. 2 is a cross-section of a part of a copying apparatus.

FIG. 3 illustrates an example of an illumination distribution when an imaging element array is used.

FIG. 6 is a perspective view of a copying apparatus according to an embodiment of the present invention.

FIG. 7 is a perspective view of two optical assemblies having different imaging magnifications.

DESCRIPTION OF THE PREFERRED EMBODIMENTS

Preferred embodiments of the present invention will be described in conjunction with the accompanying drawings.

Figure 4:
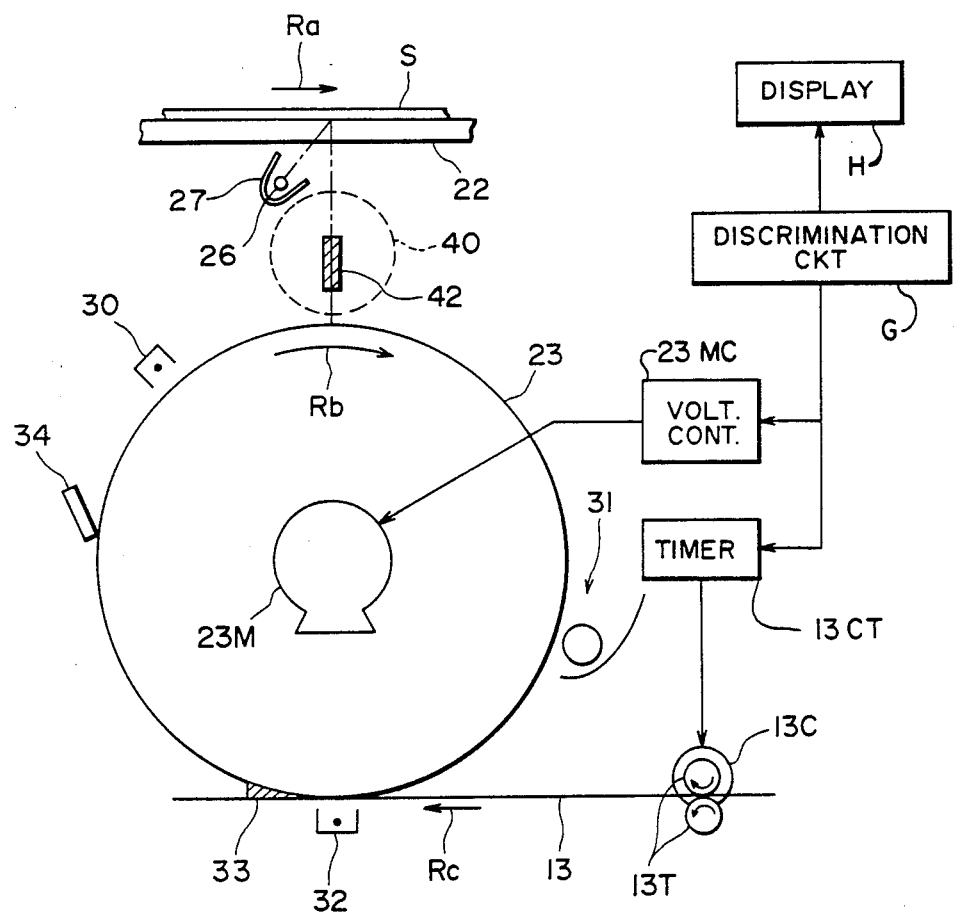
FIG. 4 illustrates a copying apparatus according to an embodiment of the present invention.

Referring now to FIG. 4, an embodiment of the present invention is shown, wherein an original document S to be copied is placed on an original carriage 22 to be scanned, and the original carriage 22 is moved in the direction shown by an arrow Ra at the same speed for any copying magnifications. The surface of the original S carrying the information to be copied is illuminated by illuminating means including an illumination lamp 26 and a lamp shade 27. The image light formed by being reflected by the original S is projected through an imaging element array 42, for example, the one which has been described hereinbefore, and focused on an electrophotographic photosensitive member 23 at its exposure station. The imaging element array 42 is contained in an interchangeable optical assembly 40 which will be described in detail hereinafter. The optical assembly 40 is detachably mountable in the copying apparatus. The photosensitive member 23 is driven by a variable speed motor 23M to rotate in the direction shown by an arrow Rb at a rotational speed which corresponds to the selected magnification, that is, at the peripheral speed obtained by multiplying the original carriage speed by the selected magnification. The photosensitive member 23 is electrically charged by a charger 30 at a charging station, whereafter it is exposed to the image light so that an electrostatic latent image is formed thereon. Then, the electrostatic latent image is visualized as a toner image by a developing device 31 at a developing station, and the thus obtained toner image is transferred, by a transfer charger 32 at a transfer station, onto a transfer material 13 being moved in the direction shown by an arrow Rc. The transfer material 13 is fed by a timing roller 13T driven through a clutch 13c by a motor so that the leading edge of the image of the original is subtantially in accord with the leading edge of the transfer material 13. The instance when the timing roller 13T is actuated with respect to the start of the original carriage 22 movement in the direction of the arrow Ra, that is, the operation timing of the clutch 13c, is changed in accordance with the magnification selected. The transfer material 13, after being subjected to the image transfer operation, is separated from the photosensitive member 23 by the separating member 33 and advanced to an unshown image fixing device, and then discharged out of the apparatus. On the other hand, the surface of the photosensitive member 23 is cleaned by a cleaning device 34 at a cleaning station so that the residual toner remained on the surface is removed.

The optical assembly will now be described in detail.

Figure 5:
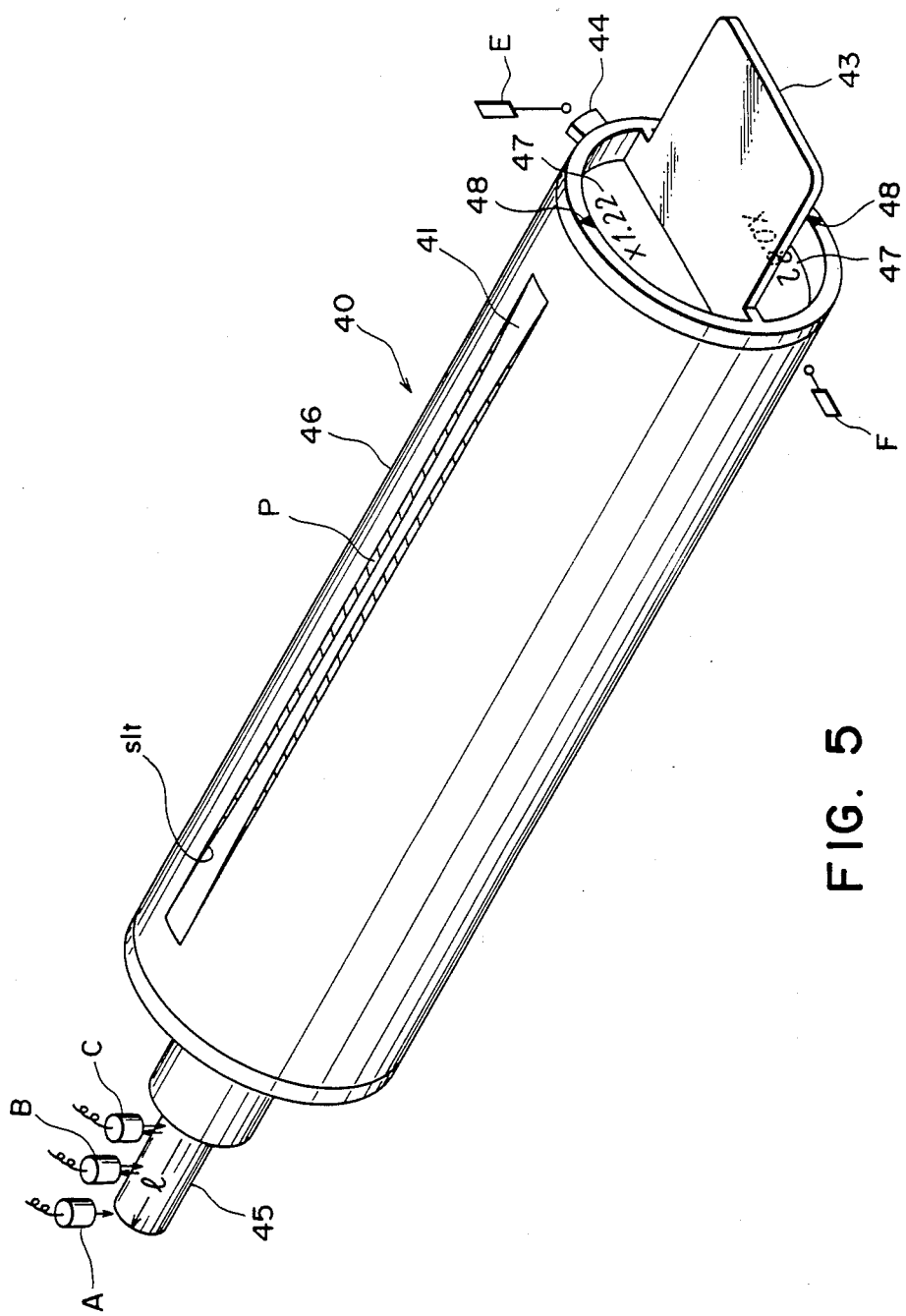
FIG. 5 is a perspective view of an example of an optical assembly according to an embodiment of the present invention.
Figure 9:
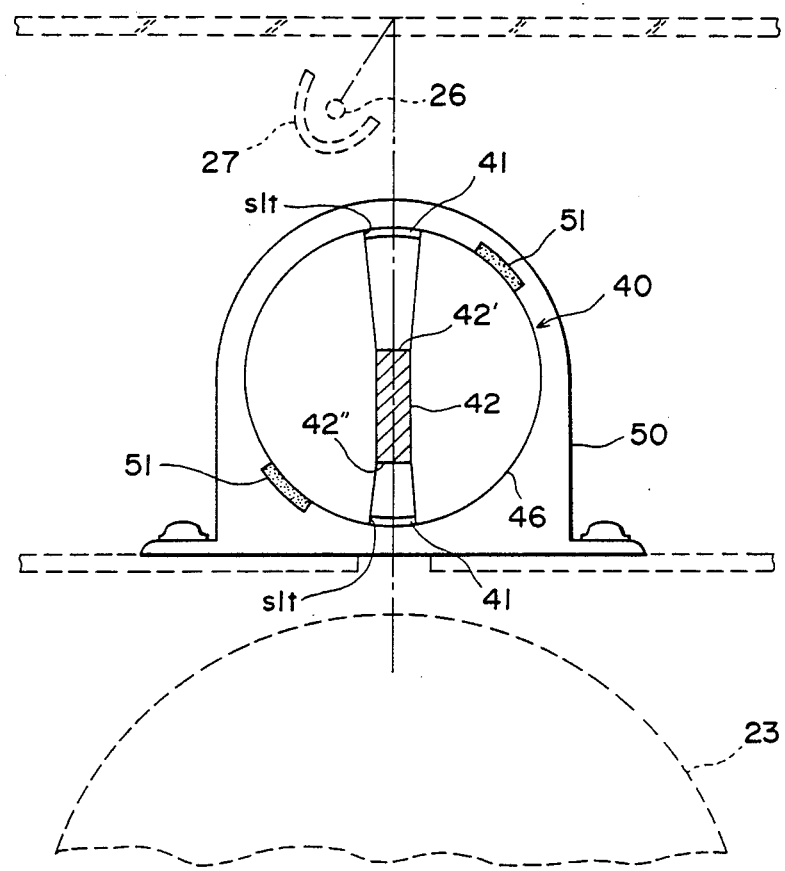
FIG. 9 is a cross-section taken along the line Y—Y of FIG. 10.
Figure 10:
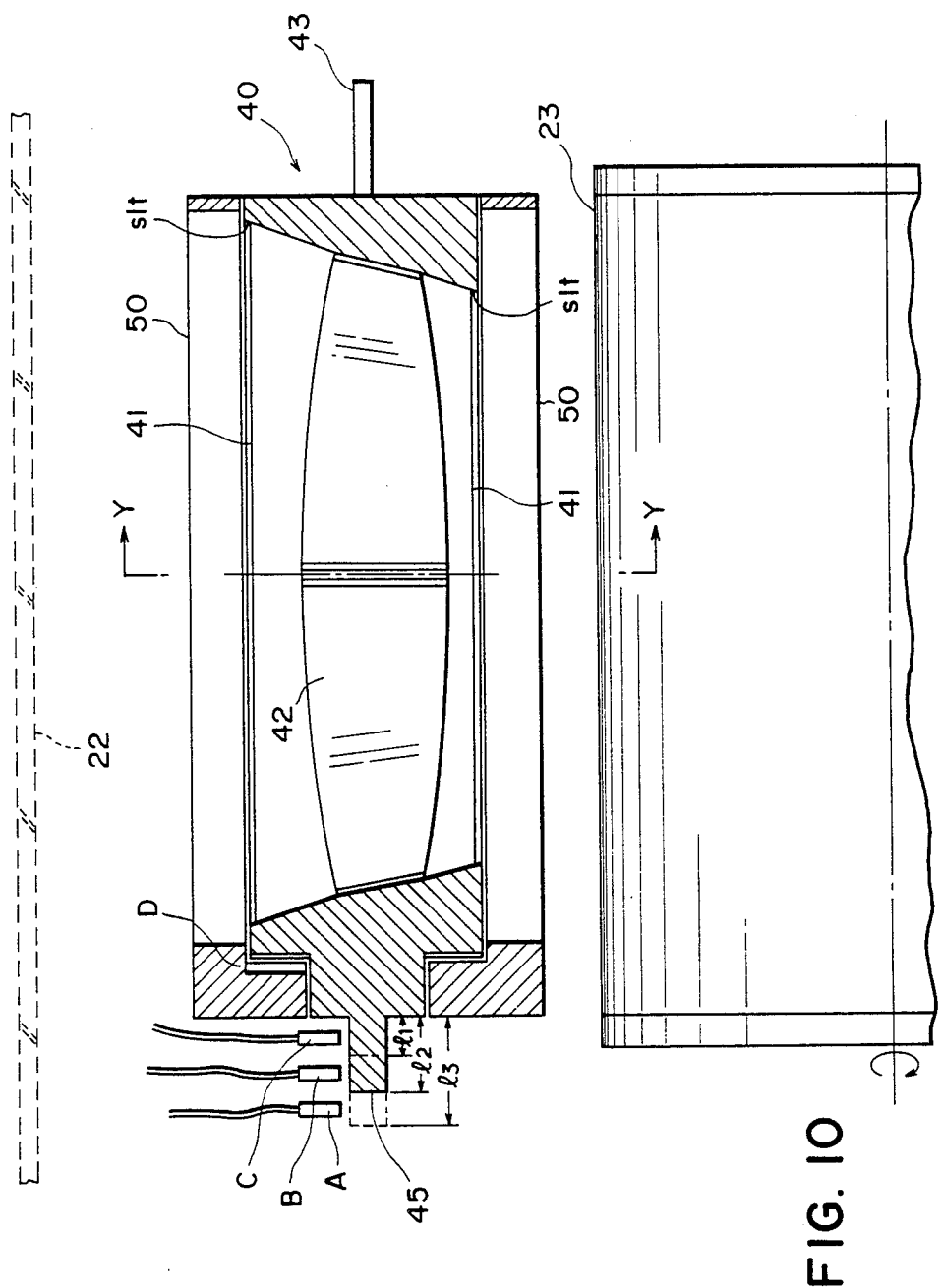
FIG. 10 is a cross-section taken along the line X—X of FIG. 8.

FIG. 5 is a perspective view of the interchangeable optical assembly 40, which includes a cylindrical casing 46 containing an imaging element array 42 as shown in FIGS. 9 and 10. The imaging element array 42 extends along the length of the casing 46. The casing 46 is provided with slits slt at positions corresponding to the light receiving surfaces of the imaging element array 42. The slits are longitudinally extended and are provided with dust-proof glass plates 41. If the imaging element array 42 is for a varied magnification (any magnification other than the unit magnification), as shown in FIG. 10, the glass plate 41 is provided with an opaque pattern P printed in order to correct the distribution of the illumination in the longitudinal direction of the imaging element array 42 on the photosensitive member 23, that is, in order to make uniform the amount of exposure in the direction of the array 42 of the elements on the photosensitive member 23. In place of printing the pattern P on the glass plate 41, the width of the slit slt may be changed in the longitudinal direction to provide a uniform distribution of the exposure amount. In the case of the imaging element array for the unit magnification, the distribution of the illumination is uniform after the light has passed through the array, but in the case of the imaging element array for the varied magnification, the elements are so positioned as shown in FIG. 1B, that is, in the fan-like fashion so that the imaging elements other than the central element are inclined with respect to the surface 1a of the original and the photosensitive surface 3a. For this reason or another, the illumination distributions 8 and 9, as shown in FIG. 3, of the light passed through the unit magnification imaging element array and the varied magnification imaging element array are such that the difference therebetween increases toward the opposite ends from the center thereof. This gives a rise to a problem of non-uniformity of the image density. The pattern or slit width described above can solve the problem. A grip 43 is formed at a longitudinal end of the cylindrical casing 46 to facilitate the mounting to or demounting from the copying apparatus or to facilitate the rotation of the optical assembly. The end surface on which the grip 43 is formed has an index 47 of the magnification to give to the operator an indication of the projection magnifiction of the imaging element array 42 contained therein and an index 48 for correctly placing the optical assembly at a position corresponding to the magnification when it is mounted in the copying apparatus. Adjacent to the end, the casing 46 is provided with a projection 44, which is engaged with a stopper 52 of the apparatus to give an assurance for the above-described positioning. At the opposite end of the casing 46, there is provided a reflection member 45 having a length corresponding to the magnification to permit detecting means to sense the magnification of the optical assembly.

The optical assembly 40 contains a varied magnification imaging element array 42, may be rotated through 180 degrees about the longitudinal axis thereof to use the same for the optical assembly containing the imaging element array of the reversed magnification. More particularly, when the first light receiving surface 42' of the imaging element array 42 is opposed to the original with the second light receiving surface 42" opposed to the photosensitive member 23, an image of the original is formed on the photosensitive member 23 at the magnification m. On the contrary, when the first light receiving surface 42' is opposed to the photosensitive member 23 with the second light receiving surface 42" opposed to the original, the magnification is 1/m. In consideration of the imaging distances for the respective magnifications, the imaging element array 42 is deviated from the central axis of the casing 46 by a predetermined distance in the direction of the optical axes thereof, so that the single optical assembly 40 may be used for two varied magnifications by rotating it through 180 degrees. To facilitate the operation, the casing 46 is provided, at its end, with the indications 47 of the magnification and the indexes 48 at the positions opposite with respect to the center of the end, wherein the indicated magnifications are reciprocal to each other.

FIG. 6 is a perspective view of the copying or imaging forming apparatus 10 into which the interchangeable optical assembly 40 has been mounted.

Figure 8:
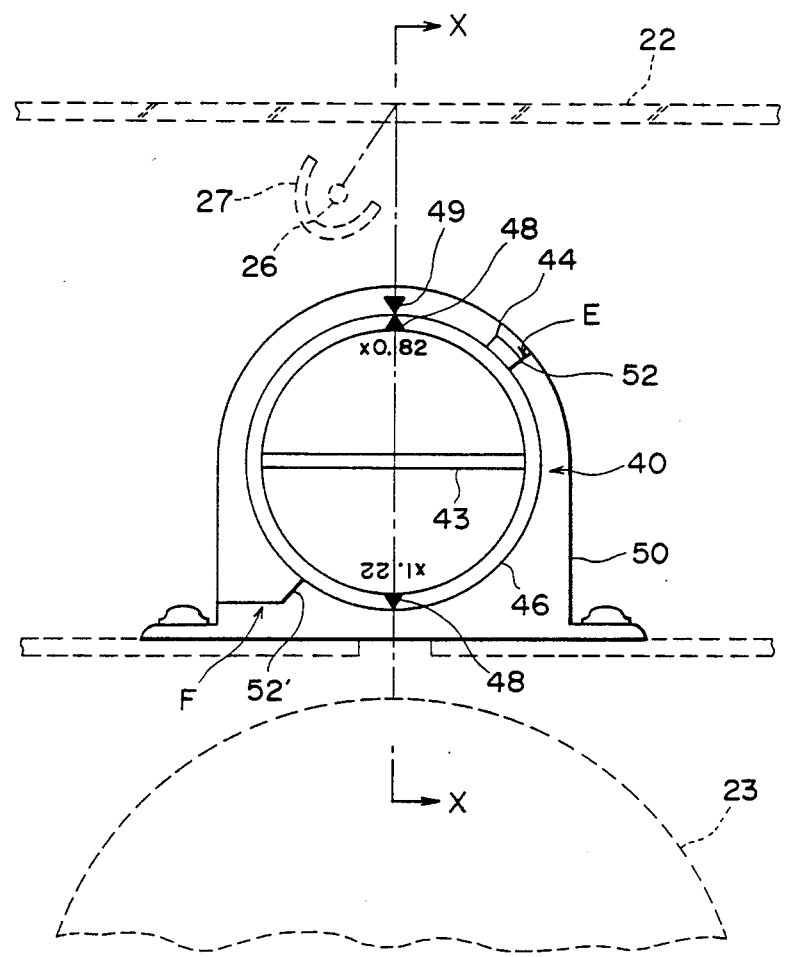
FIG. 8 is a side view of a part of the apparatus shown in FIG. 6.

The copying apparatus 10 is provided therein with a housing 50, as shown in FIGS. 8-10, as a supporting member for slidably guiding the interchangeable optical assembly 40 in the direction of the length thereof and placing the imaging element array 42 at the correct optical position. Also, the front side of the copying apparatus 10 is provided with a port for allowing the mounting and demounting of the optical assembly 40 therethrough. The housing 50 is provided with stoppers 52 and 52' engageable with the projection 44 as shown in FIG. 8, for the purpose of effecting the correct positioning of the interchangeable optical assembly 40 in its rotational direction. The housing 50 has, adjacent to the port, an index 49 which is to be aligned with the index 48 of the interchangeable optical assembly 40, when it is placed at a proper rotational position. As shown in FIG. 9, on the inside surface of the housing 50, there is provided a cleaning member 51 of felt or MOLTPLANE (trademark), which are contactable with the surface of the casing 46 of the optical assembly 40. The cleaning member 51 extends in the longitudinal direction of the casing so that when the interchangeable optical assembly 40 is rotated within the housing 50, the cleaning member 51 can remove the toner particles and paper dust or the like from the surfaces of the glass plate 41.

As has been mentioned with respect to FIG. 5, the interchangeable optical assembly 40 is provided at its rear end with a reflecting member 45 for the magnification detection. As shown in FIGS. 7 and 10, the length l of the reflecting member 45 is changed for each of the interchangeable optical assemblies, corresponding to the projection magnification of the imaging element array 42 contained therein. For example, the length l is 0 for the unit magnification optical assembly, $l_1$ for the optical assembly of 1.16 (0.86) magnification, $l_2$ for the optical assembly of 1.22 (0.82) magnification, $l_3$ for the optical assembly of 1.41 (0.71) magnification, wherein $l_1 < l_2 < l_3$. On the other hand, in the copying apparatus 10, photosensors A, B and C of reflection type are provided at positions corresponding to the above described length of each of the optical assemblies, as shown in FIGS. 5 and 10. The photosensors each include a light emitting element and a light receiving element for receiving the light emitted by the light emitting element and then reflected by the object. Thus, the light reflected by the reflecting member 45 is received by the corresponding photosensor or photosensors. For example, when the length is $l_1$, $l_2$ or $l_3$, the photosensor C, B or A receives light correspondingly, but when the length is 0, none of the photosensors receives the reflected light. As shown in FIG. 5, the projection 44 acts on a switch E when it abuts the stopper 52. Thus, the switch E functions as a switch for discriminating whether the interchangeable optical assembly 40 is correctly positioned in its rotational direction. Similarly, when the projection 44 abuts the stopper 52', it acts on a switch F for discriminating whether the optical assembly 40 is correctly positioned in its rotational direction. The switches E and F are also effective to determine which magnification of the two projection magnifications of the optical assembly is used, that is, as to the direction in which the optical assembly is used. Furthermore, at a position where the rear end of the inside surface of the housing 50 and the rear end of the interchangeable optical assembly 40 are engaged, there is provided a switch D made of a pressure conductive rubber so that it is rendered "on" when the rear end surface of the optical assembly 40 is engaged as shown in FIG. 10, and therefore, the confirmation is assured that the interchangeable optical assembly 40 is placed correctly at a predetermined position in the housing 50.

Figure 12:
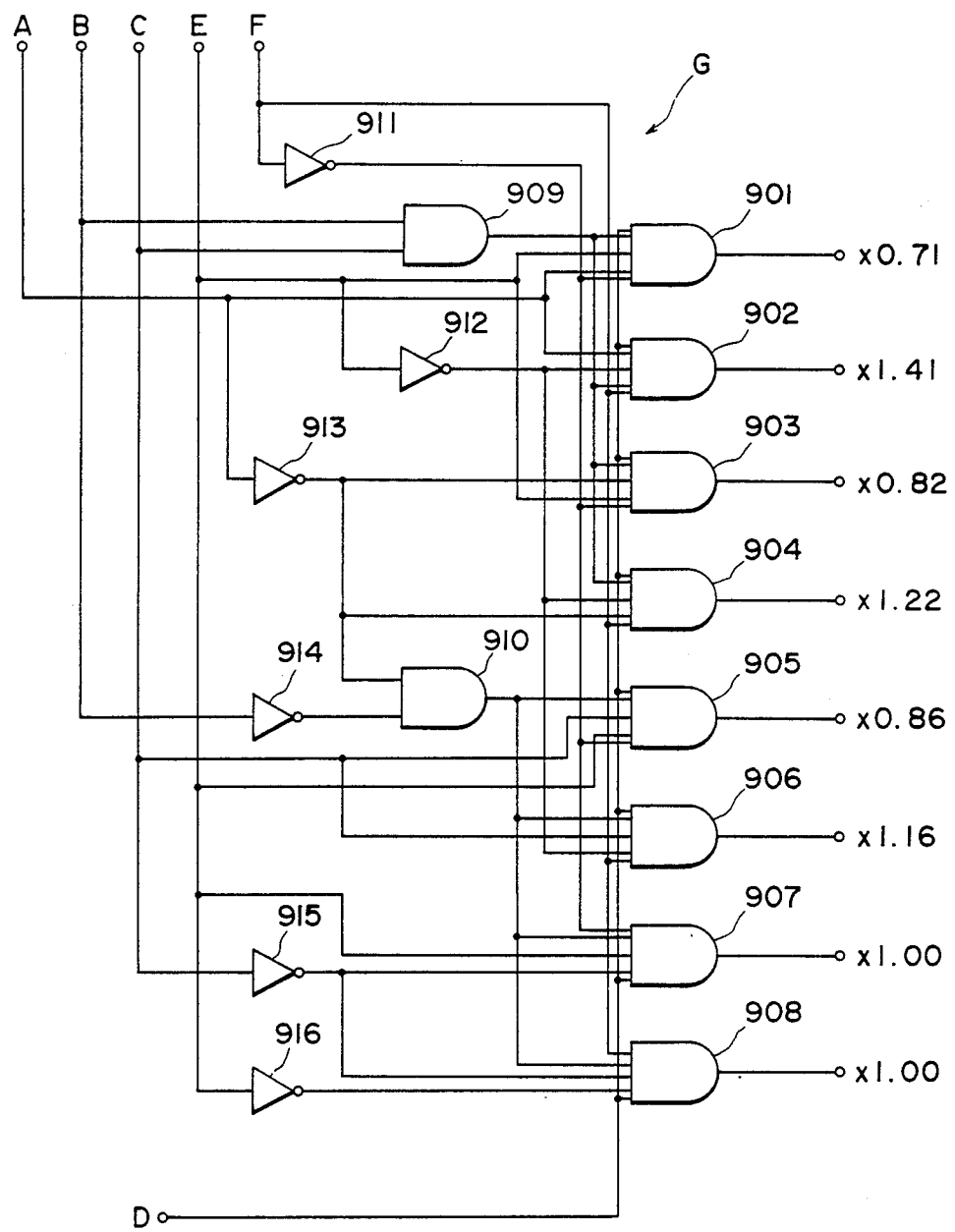
FIG. 12 shows a circuit for discriminating the copying magnifications.

As will be understood from FIGS. 6 and 7, the interchangeable optical assembly 40 which is in place in the copying apparatus 10 may be interchanged with one of the other optical assemblies 40a and 40b having different magnifications as desired, without difficulty. Since each interchangeable optical assembly 40 is provided with indications of the magnifications as shown in FIGS. 5 and 7, the operator can set in the apparatus 10 an interchangeable optical assembly 40 and position it so as to align the index 48 to the index 49. When the projection 44 is engaged to the stopper 52, the imaging element array 42 is set to the reduction projection state as shown in FIGS. 9 and 10. If the interchangeable optical assembly 40 is rotated counterclockwise through 180 degrees so that the projection 44 is engaged to the stopper 52', the imaging element array 42 is set to the enlargement projection state. In response to each of such settings, the process speed or other parameters of the image formation is selected in accordance with the set magnification which is sensed by the photosensors A, B and C and switches D, E and F. FIG. 12 shows an example of a discrimination circuit G for discriminating the selected magnification on the basis of the above-described sensors and switches and controlling the motor 23M and the clutch 13C. The discrimination circuit G comprises 5-input AND circuits 901–908, 2-input AND circuits 909 and 910, and inverter circuits 911–916. The discrimination circuit G is effective to produce a single signal corresponding to each of the magnifications from the combinations of the binary signals produced by the photosensors A, B and C and switches D, E and F. For example, the photosensors A, B and C each produce a high level signal when it receives the light reflected by the reflection member 45; and when not detecting the reflected light, it produces a low level signal. The switches D, E and F each produce a high level signal when it is closed; and when it is opened, it produces a low level signal. Table 1 is a truth table in this case.

TABLE 1

| A | B | C | D | E | F | MAGNIFICATIONS |
|---|---|---|---|---|---|----------------|
| H | H | H | H | H | L | 0.71 |
| H | H | H | H | L | H | 1.41 |
| L | H | H | H | H | L | 0.82 |
| L | H | H | H | L | H | 1.22 |
| L | L | H | H | H | L | 0.86 |
| L | L | H | H | L | H | 1.16 |
| L | L | L | H | H | L | 1.00 |
| L | L | L | H | L | H | 1.00 |

The above described discrimination circuit G is constructed so as to satisfy the Table. For instance, when the interchangeable optical assembly 40 is set to the magnification of 1.22, the length of the reflection member 45 is equal to $l_2$, so that, as shown in Table 1, the photosensors B and C and the switches D and F produce the high level signals, whereas the photosensor A and the switch E produce the low level signals. In this case, the circuit shown in FIG. 12 is such that only the AND circuit 904 receives all five inputs at the high level, and therefore, the AND circuit 904 only produces the high level signal. The magnification signal thus obtained in the discrimination circuit G of FIG. 12 is transmitted to a driving voltage controlling circuit 23MC for the DC motor 23M and a timer circuit 13CT for controlling the operation timing of the timing roller 13T. Thus, the voltage applied to the motor 23M and the timing of the roller 13T operation are controlled in accordance with the magnification selected. Therefore, the photosensitive member 23 rotates at a speed corresponding to the selected magnification. Also, the roller 13T is actuated with the delay of time corresponding to the selected magnification, from the start of the original carriage movement, such that the leading end of the image formed on the photosensitive member and the leading end of the copy sheet is substantially aligned.

If, however, the switch D produces a low level signal, and both of the switches E and F produce low level signals, that is, if the optical assembly 40 is not set in place in the apparatus, the discrimination circuit G of FIG. 12 does not produce any magnification signal. On that occasion, therefore, the motor 23M and clutch 13C do not operate so that the copying operation is not performed.

The signal produced by the discrimination circuit G is transmitted also to a display H constructed by light emitting diodes or the like. The display H indicates whether the optical assembly 40 is set in place in the apparatus (therefore, whether the copying operation is executable or not), and also provides an indication of the copying magnification corresponding to the optical assembly 40 set in the apparatus.

In the foregoing embodiment, the speed of the photosensitive member 23 is changed in accordance with the selected magnification, but the speed of the original movement may be changed in accordance with the selected magnification. In this case, the rotational speed of the driving motor for the original carriage 22 is controlled in accordance with the signal produced by the discrimination circuit G.

In the foregoing embodiment, the length of the reflecting member provided at the rear end of the interchangeable optical assembly is changed in accordance with the magnification of the elements contained therein, but the following is an alternative. The surface of the reflecting member is so treated that it does not exhibit a light reflection property, and the length thereof is made equal for all of the interchangeable optical assembly. On the surface so treated, a reflecting sheet (for example, an aluminum foil) is bonded. The reflecting sheet has a different length for each interchangeable optical assembly 40. Then, the photosensors explained with respect to the foregoing embodiment may be used for detecting the imaging magnification of the assembly when it is mounted in the apparatus.

Figure 11:
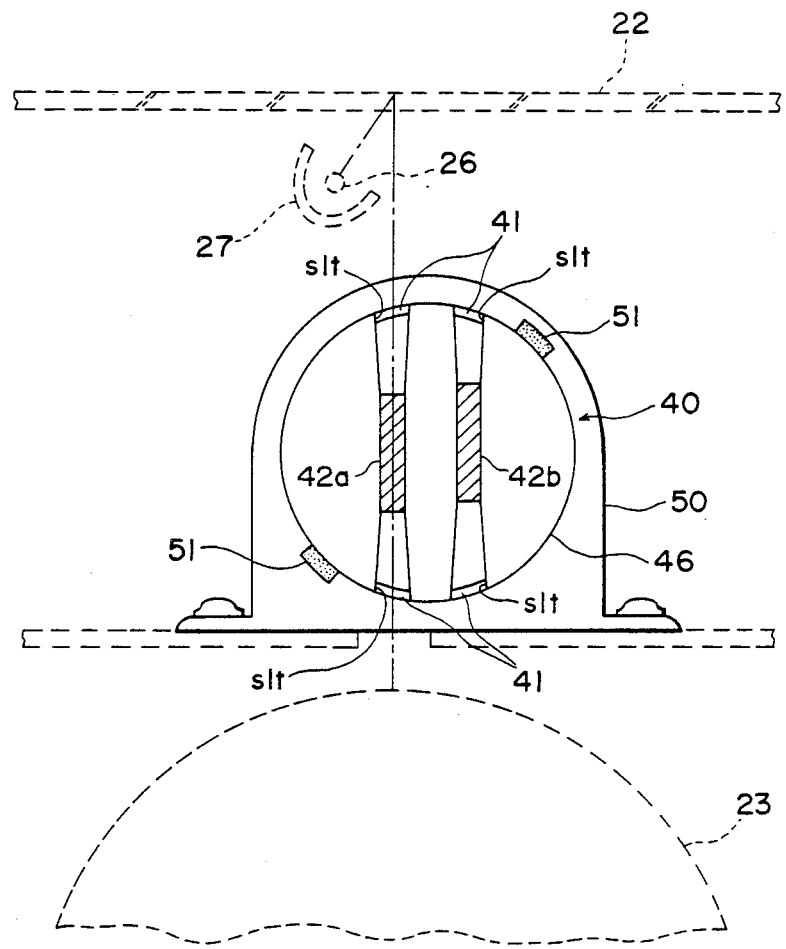
FIG. 11 is a cross-section of a part of a copying apparatus according to another embodiment of the present invention.

FIG. 11 shows an interchangeable optical assembly 40 according to another embodiment of the present invention, wherein two imaging element arrays 42a and 42b are juxtaposed with a space therebetween. Those arrays are equidistant from the rotational axis of the interchangeable optical assembly 40. Corresponding to the respective imaging element arrays 42a and 42b, four slits with glass plates 41 are formed in the casing 46. The optical assembly 40 is shown in FIG. 11 as being used with its imaging element array 42a placed in the image projection optical path for the photosensitive member 23. It will be understood that when the optical assembly 40 is rotated through 180 degrees, the imaging element array 42b is used for the image formation. Since, in this embodiment, two imaging element arrays are provided in the interchangeable optical assembly, the two magnifications which are independent from each other (which are not necessarily a reciprocal to each other) can be used, unlike the foregoing embodiment. For example, one 42a of the imaging element arrays is designed for the unit magnification, while the other 42b is for a reduction or enlargement. Alternatively, both may be for the reduction or for the enlargement, thus, a greater number of combinations are made possible. The structures other than described above may be the same as those described with respect to the foregoing embodiment, for example, the magnification discriminating circuit, photosensors and switches.

Figure 13A:
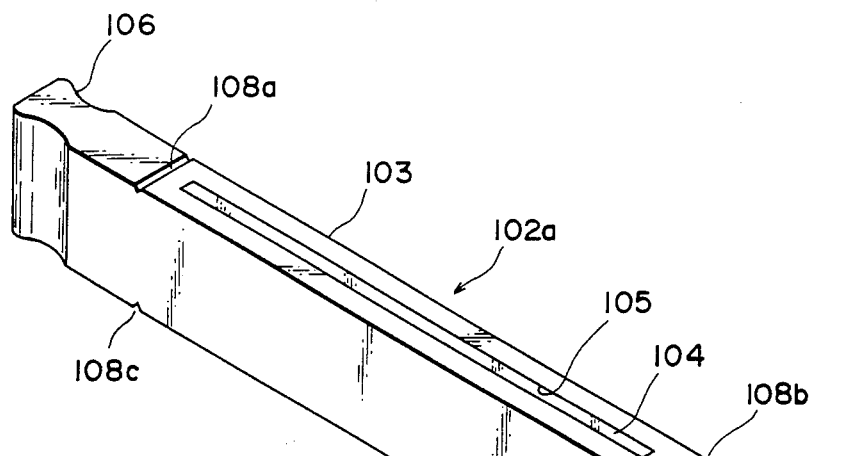
FIG. 13A and FIG. 13B are perspective views of optical assemblies usable with another embodiment of the present invention.
Figure 13B:
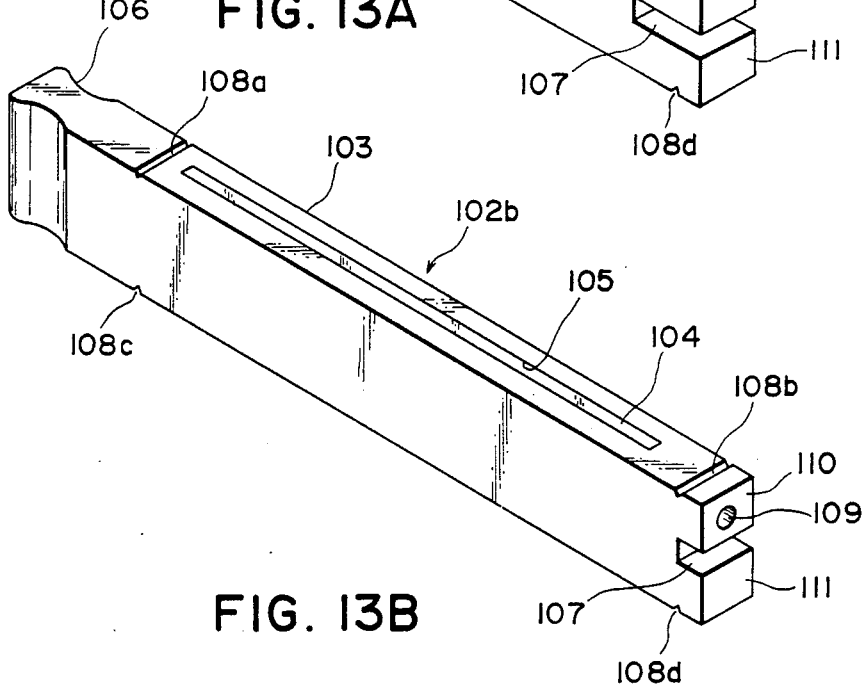

FIGS. 13A and 13B are perspective views, seen from the rear side, of the optical assembly according to another embodiment of the present invention.

Figures 16A, 16B:
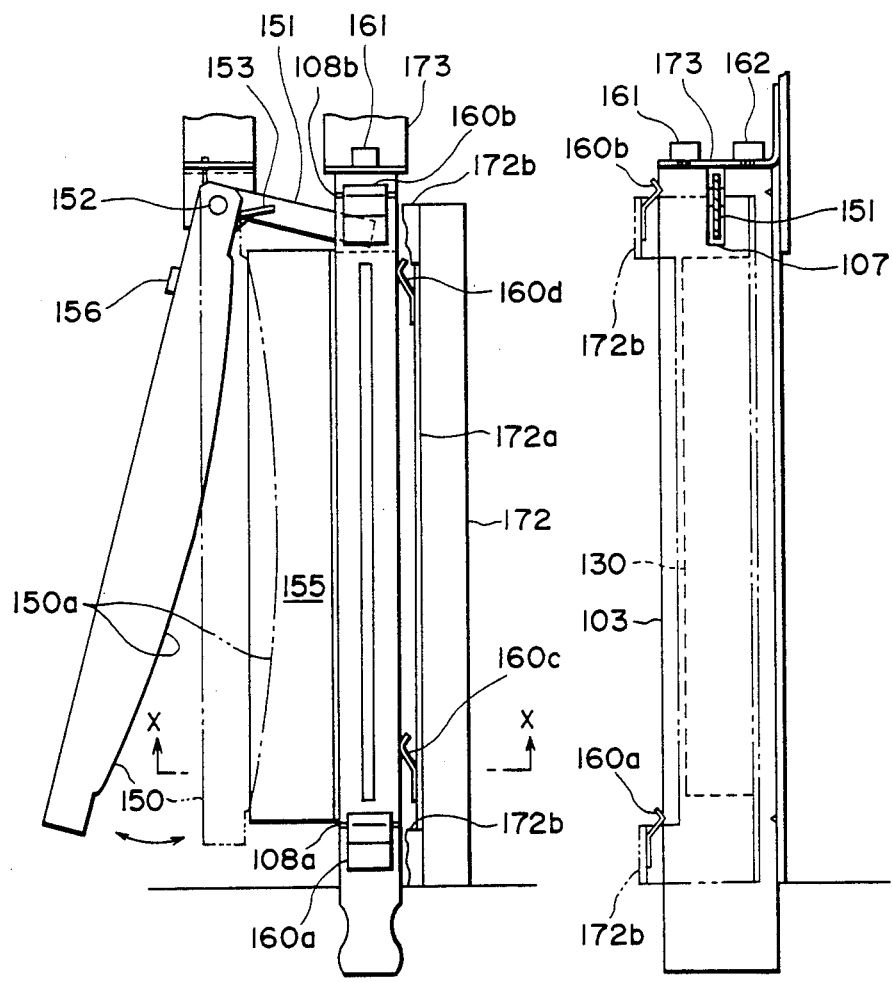
FIG. 16A and FIG. 17A are plan views of a part of the apparatus shown in FIG. 14.
FIG. 16B and FIG. 17B are side views of the parts shown in FIGS. 16A and 17A, respectively.

The interchangeable optical assembly 102a for the unit magnification comprises a casing 103 having a rectangular cross-section, in which an array 130 of the imaging elements for the unit magnification is arranged along the length of the casing 103. In the top and bottom walls of the casing 103, slits 105 with dust proof glass plates 104 are formed in the longitudinal direction thereof at the positions corresponding to the light receiving surfaces of the imaging element array 130. In order to facilitate the mounting and the demounting of the assembly, a grip 106 is formed by curving the casing adjacent to a front end of the casing 103, as shown in FIGS. 13A and 13B. At the rear end of the casing 103, a deep groove 107 is formed so that the casing is not interfered with a lever 151 integrally formed with a light blocking plate 150 for correcting the illumination distribution as shown in FIG. 16A. Also, on the top and bottom walls of the casing 103 adjacent to its front and rear ends, there are provided click notches 108a, 108b, 108c and 108d for engaging with leaf springs 160a and 160b shown in FIG. 16A. The rear ends of the casing 103 constitutes projections 110 and 111 for actuating microswitches which function as magnification detecting means.

Figures 17A, 17B:
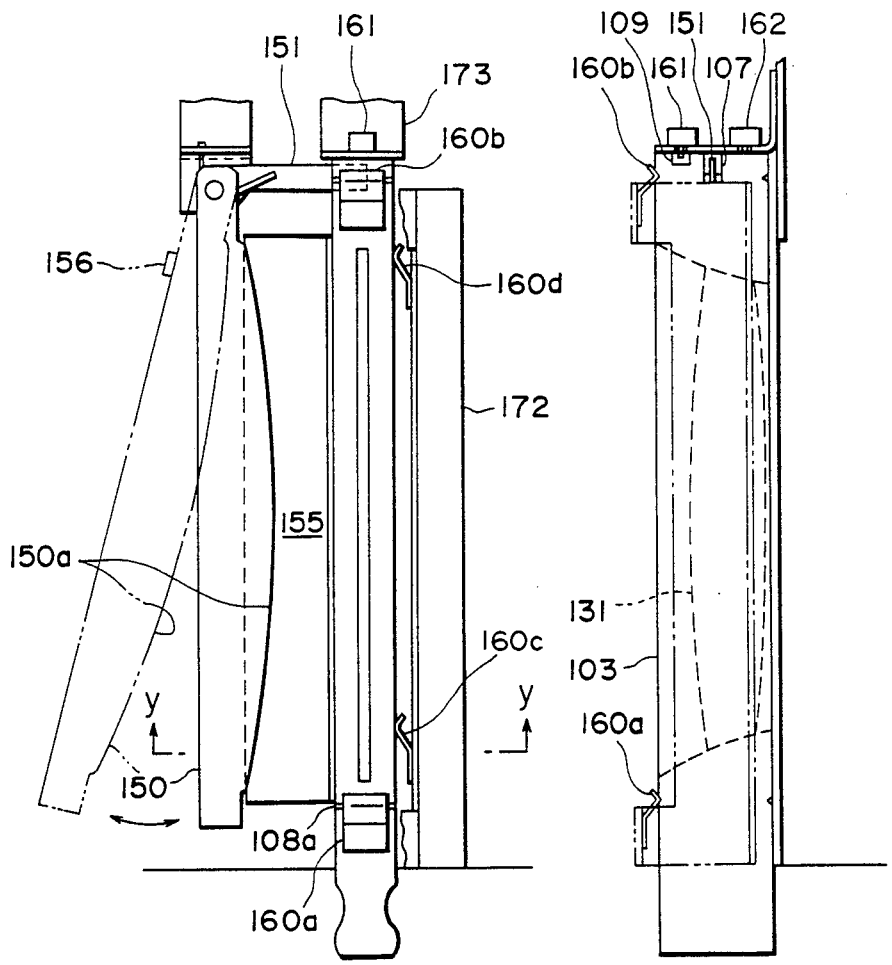
Figure 17C:
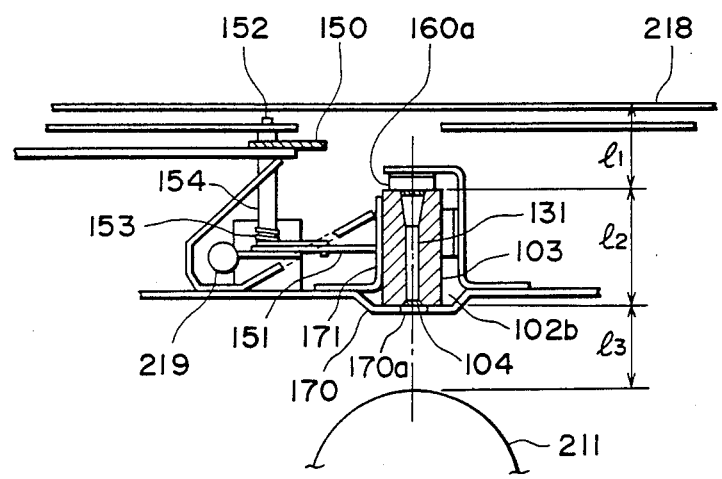

An interchangeable optical assembly 102b be for a varied magnification is provided in the casing 103 with an imaging element array 131 for a varied magnification as shown in FIG. 17C, which extends along the length of the casing 103. Similarly to the interchangeable optical assembly 102a for the unit magnification, the top and bottom walls of the casing 103 is provided with slits, dust-proof glass plates 104, click notches 108a, 108b, 108c and 108d. As shown in FIG. 17A, a shallow groove 107 is formed so that the casing interferes with the lever 151. At the rear end of the casing, there is provided on the projection 110 a recess 109 to receive a button of the microswitch 161 which functions as a magnification detecting means.

Figure 14:
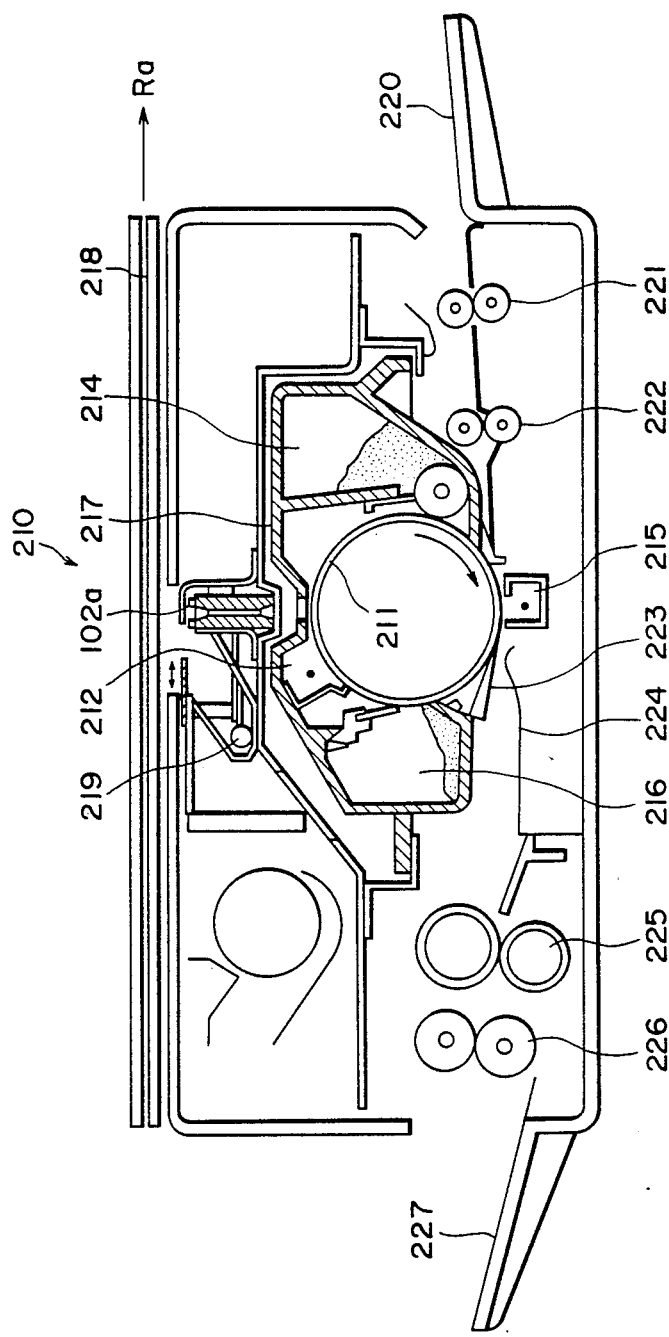
FIG. 14 is a cross-sectional view of a copying apparatus according to a further embodiment of the present invention.

FIG. 14 is a cross-sectional view of a coying apparatus 210 which is loaded with the above-described interchangeable optical assembly. The copying apparatus 210 which is an electrophotographic coying machine is shown as an example of an image forming apparatus. An electrophotographic photosensitive drum 211 having a conductive base drum having thereon a photoconductive layer is rotatable at the same speed independently of the copying magnifications, in the direction of the arrow. Around the photosensitive drum 211, there are provided, similarly to the embodiment described with FIG. 4, a corona discharger 212, a developing device 214, a transfer corona discharger 215 and a cleaning device 216 in the direction of the drum rotation, which are all supported integrally by a frame 217. Above the photosensitive drum 211, an interchangeable optical assembly is positioned between the corona discharger 212 and the developing device 214, which will be described in detail hereinafter. An illumination lamp 219 illuminates an original carried on the original carriage 218. An image of the original is projected onto the photosensitive drum 211 through the interchangeable optical assembly at a magnification inherent to the loaded optical assembly. A known means is used for feeding the transfer material, which comprises a transfer material supplying tray 220, transportation roller 221, timing rollers 222 for feeding the transfer material to the transfer station at a timing corresponding to the selected magnification so that the leading edge of the transfer material is substantially aligned with the leading edge of the image on the photosensitive member, a separating member 223, a passage 224, a fixing means 225, discharging rollers 226 and a discharge tray 227.

The general operation of the copying apparatus described above will now be described.

The photosensitive drum 211 is uniformly charged to a predetermined polarity by the corona discharger 212 at the charging station. Then, the original placed on the original carriage 218 is illuminated by the lamp 219. The original is carried on the original carriage 218 which is reciprocable at an upper position of the apparatus 210, and which moves upon the original scanning operation in the direction shown by an arrow Ra at a speed corresponding to the selected magnification, that is, at the speed obtained by dividing the peripheral speed of the photosensitive drum 211 by the selected magnification. The light image of the original is projected onto the surface of the photosensitive drum 211 at the exposure station through the interchangeable optical assembly, so that an electrostatic latent image of the original is formed on the photosensitive drum. The electrostatic latent image formed on the photosensitive drum 211 is visualized as a toner image by the developing device 214 at the developing station, and the toner image is transferred onto the transfer material at the transfer station by the transferring corona discharger 215. The transfer material is supplied on the tray 220 by the operator and fed through the transportation rollers 221 and the timing rollers 222 to the transferring station. The transfer material, after having been subjected to the image transfer operation, is then separated from the photosensitive drum 211 by the separating member 223, and thereafter, advanced on the passage 224 to the image fixing means 225, which fixes the transferred toner image on the transfer material. Finally, the transfer material is discharged out of the apparatus by the discharging roller 226 to the discharge tray 227.

Figure 15:
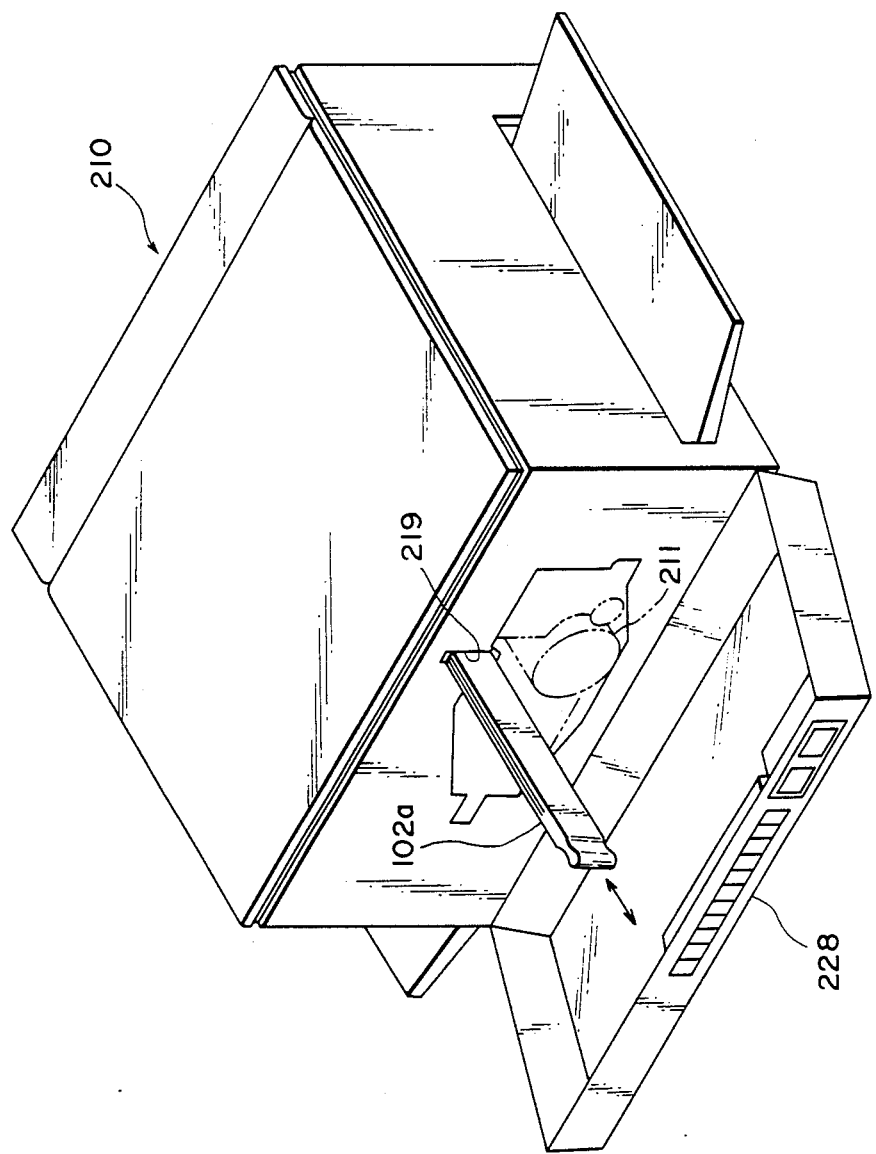
FIG. 15 is a perspective view of the apparatus shown in FIG. 14.

When the interchangeable optical assembly is mounted into the copying apparatus, or when it is demounted from the apparatus 210, the front cover 228 of the apparatus 210 is opened, as shown in FIG. 15, and then the interchangeable optical assembly is inserted or pulled through the port 219 provided at the front side of the apparatus, in the direction of the arrow, that is, the longitudinal direction of the drum 211.

Figure 16C:
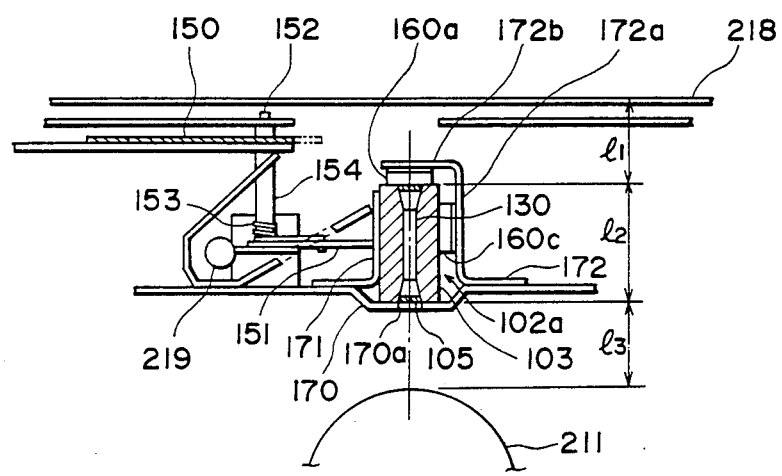
FIG. 16C and FIG. 17C are cross-sections taken along x—x and y—y of FIGS. 16A and 17A, respectively.

FIGS. 16A, 16B and 16C show the interchangeable optical assembly 102a for the unit magnification which is mounted in the apparatus. As shown in FIG. 16C, the apparatus includes a horizontal supporting plate 170 for supporting the interchangeble optical assembly at the bottom face thereof, the supporting plate 170 being parallel with the photosensitive drum 211. The apparatus also includes another supporting plate 171 having a cross-section of a reversed "L" for supporting the side wall of the optical assembly, which supporting plate 171 is fixed on the supporting plate 170. An opening 170a is formed in the supporting plate 170, which has the configuration corresponding to the slit 105 of the interchangeable optical assembly. To the supporting plate 170, another supporting plate 172 is fixed, to which supporting plate 172 leaf springs 160c and 160d are mounted adjacent to the front side and the rear side of the perpendicular portion 172a thereof to contact one of the side walls of the interchangeable optical assembly and press the other side wall to the supporting plate 171. Furthermore, at the front and rear ends of the supporting plate 172, a horizontal projection 172b is formed, and at the bottom face thereof, there are provided leaf springs 160a and 160b for contacting the top face of the interchangeable optical assembly and pressing the bottom face thereof to the supporting plate 170. The leaf springs 160a and 160b are also effective to engage with the click notches 108a and 108b formed in the interchangeable optical assembly to position the optical assembly in the longitudinal direction. At the rear side of the supporting member 170, a stopper 173 is fixed to limit the longitudinal position of the interchangeable optical assembly 102a. The click grooves or the stopper 173 may be eliminated.

Therefore, in the structure shown in FIGS. 16A, 16B and 16C, the supporting plate 170 is effective to correctly place the interchangeable optical assembly between the original carriage 218 and the photosensitive drum 211 at a predetermined position, while the supporting plate 171 is effective to position the interchangeable optical assembly in the direction of the original carriage movement and to orient the array of the imaging elements to be parallel with the optical path. When the operator inserts the interchangeable optical assembly through the port 219 as shown in FIG. 15 until it abuts the stopper 173, the leaf springs 160a and 160b engage with the click grooves 108a and 108b, respectively, so that it is correctly positioned in its longitudinal direction and that the correct position is maintained even when the apparatus is vibrated due to the reciprocation of the original carriage.

As shown in FIGS. 16A and 16B, the stopper 173 is provided with microswitches 161 and 162 in the manner that their switch buttons are projected beyond the surface of the stopper 173. The projections 110 and 111 of the unit magnification optical assembly 102a actuate the switch buttons of the microswitches 161 and 162, respectively to render the microswitches 161 and 162 ON. This makes it possible to detect that the interchangeable optical assembly 102 being used is the one for the unit magnification.

Further, as shown in FIGS. 16A and 16C, a light blocking plate 150 having a width which changes in its longitudinal direction is pivotably mounted to the apparatus on a pin 152. Below the light blocking plate 150 there is provided a lever 151 which is secured to the light blocking plate 150 by a shaft 154 in the manner that it is integrally movable with the light blocking plate 150. A coil spring 153 is engaged between a part of the apparatus and the lever 151 to bias the light blocking plate 150 in the clockwise direction as seen in FIG. 16A. The light blocking plate 150 is contoured so that, when it is moved to a position for blocking a part of the original illuminating optical path 155 between the lamp 219 and the original (the position shown by the chain line in FIG. 16A), the distribution of the light incident on the original surface is changed in the direction of the array of the imaging elements. The light blocking plate 150 is used only when the interchangeable optical assembly 102b for the valid magnification is used. This is effective to correct the distribution of the illumination on the original, and therefore, to make uniform the distribution of the exposure amount of the photosensitive member in the direction of the array. Since the unit magnification optical assembly 102a is provided with a deep groove 107 at the center of the rear end, the lever 151 is not actuated by the optical assembly 102a, when it is set in place in the apparatus. Therefore, the light blocking plate 150 is urged in the clockwise direction as shown by the solid line in FIG. 16A and engaged to the stopper 156 formed on a part of the apparatus, whereby the light blocking plate 150 does not block the original illuminating path 155. Then, the distribution of the illumination on the original is uniform in the direction perpendicular to the original scanning, that is, in the direction of the array of the imaging elements. Thus, the distribution of the exposure amount of the photosensitive member is made uniform in the direction of the array of the imaging elements.

FIGS. 17A, 17B and 17C illustrate the interchangeable optical assembly 102b for a varied magnification when it is mounted in the apparatus. Since the projection 110 at the rear end of the interchangeable optical assembly 102b is provided with a recess 109 at a position corresponding to the switch button of the microswitch 161, only the microswitch 161 is rendered OFF. Because of this, it is detected that the optical assembly being used is for forming a reduced image of the original on the photosensitive member.

Since the groove 107 formed at the rear end of the optical assembly 102b is shallow, the optical assembly 102b, when inserted into the apparatus, pivots the lever 151 against the spring force exerted by the coil spring 153, with the result that the light blocking plate 150 blocks a part of the original illuminating optical path 155 as shown by the solid line in FIG. 17a. Then, the distribution of the illumination of the original is not uniform, that is, it changes in the direction perpendicular to the original scan so as to correct the non-uniformness inherent to the imaging element array for the varied magnification as shown in FIG. 3. The restoring force of the coil spring 153 is made smaller than the friction force between the interchangeable optical assembly 102b and the respective supporting plates 170 and 171, so that the optical assembly 102b is engaged to the stopper 173 and is maintained at the position.

If the interchangeable optical assembly 102b is set upside-down, an enlarged image of the original is formed on the photosensitive member. For example, the magnification of 0.707 (reduction) is switched to its reciprocal, that is, the magnification of 1.414 (enlargement). In this case, the button of the microswitch 162 is received by the recess 109 so that the microswitch 162 is rendered OFF to make it possible to detect that an enlarged image of the original is formed on the photosensitive member. The light blocking plate 150 blocks a part of the original illuminating path 155, similarly to the case of the reduction.

Figure 18:
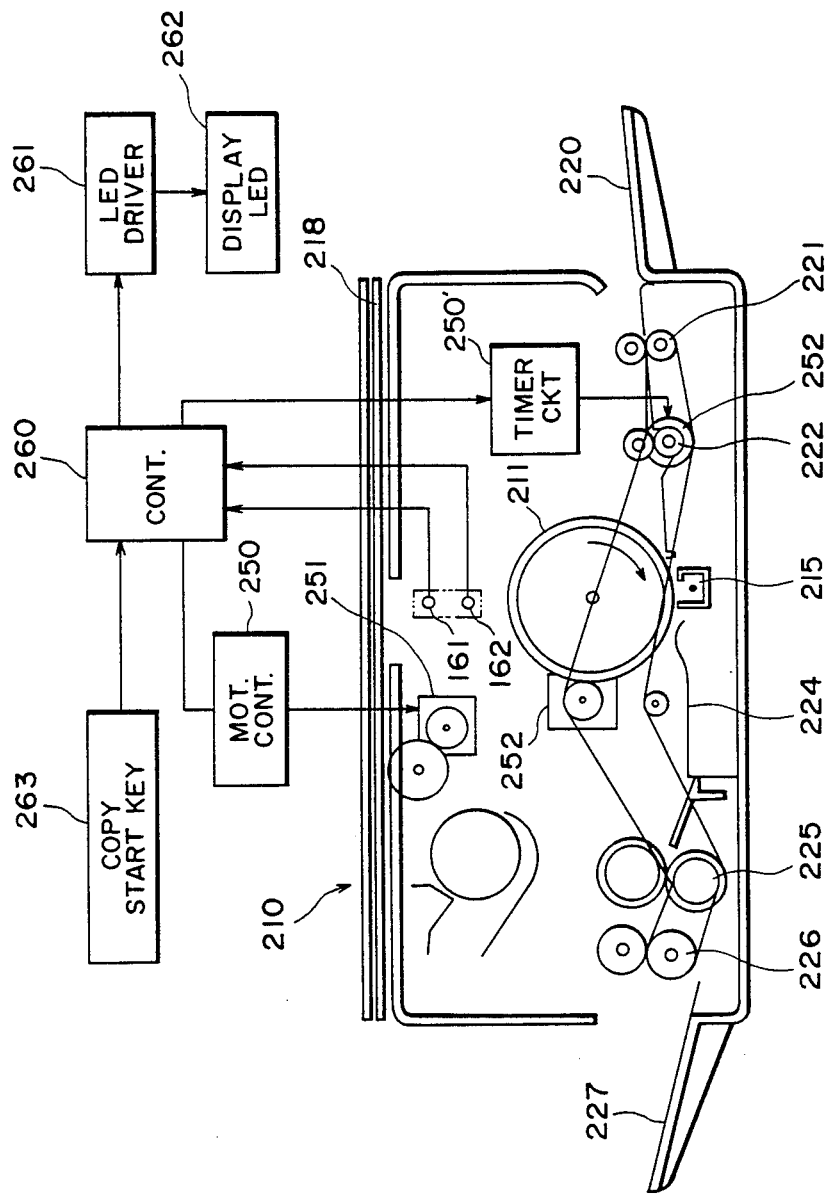
FIG. 18 and FIG. 19 are block diagrams of a controlling system.
Figure 19:
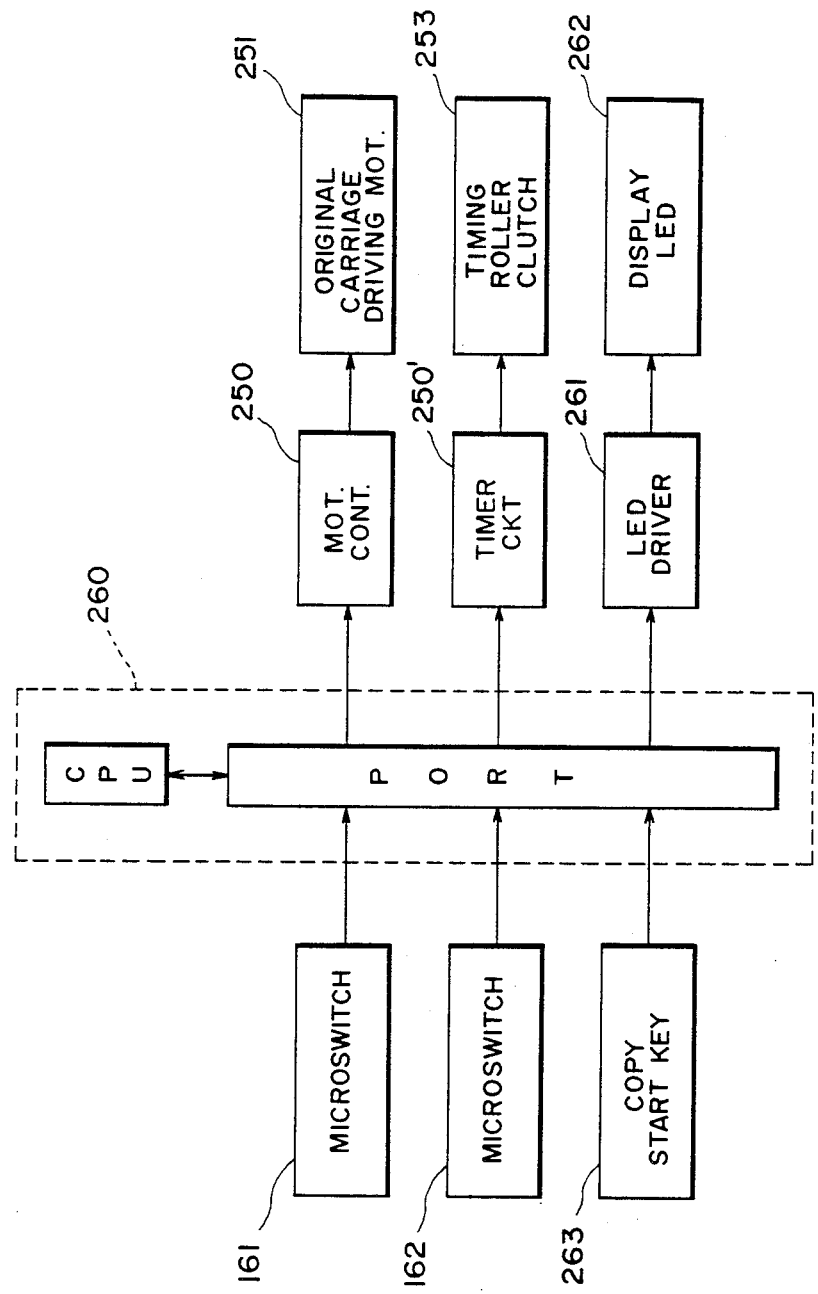
Figure 20:
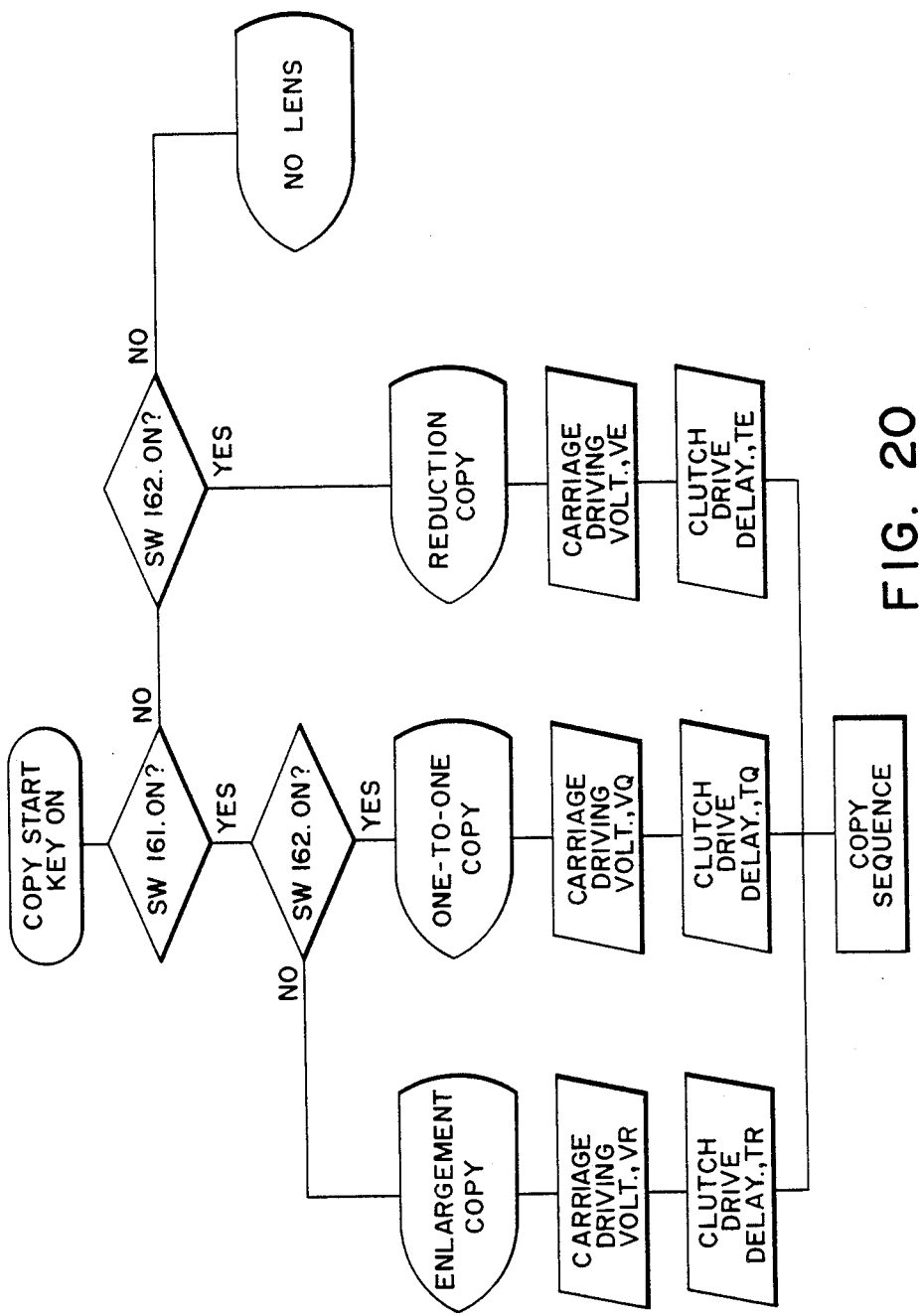
FIG. 20 is a flow chart of the controlling system.

A detailed description will be made with respect to the control of the driving means in response to the selected magnification which is detected by the states of the microswitches 161 and 162. As shown in FIGS. 18 and 19, a controller 260 provided in the apparatus 210 and having a microcomputer CPU receives the signals from the microswitches 161 and 162 actuated in accordance with the magnification of the interchangeable optical assembly and the start signal produced by the copy starting key 263. The output signal of the controller 260 is transmitted to a driving circuit 261 for a light emitting diode display means 262 which is effective to display the selected magnification and indicate whether the optical assembly is placed at the correct position in the apparatus, to a drive-control circuit 250 for a motor 251 for reciprocating the original carriage through a rack-pinion mechanisms and others and to a timer 250' for controlling the clutch 253 for transmitting a driving force from a motor 252 to the timing roller. The controller 260 is responsive to the signals from the microswitches 161 and 162 and from the copy start key 263 to control the circuits 250, 250' and 261 in the manner shown in the flow chart of FIG. 20.

If both of the microswitches 161 and 162 are OFF, there is no optical assembly set in the apparatus, or it is not correctly positioned, so that "NO LENS" is displayed on the display means 262. Even if the copy start key is actuated, the motor 251 and the motor 252 for rotating the drum 211 are not rotated. In other words, the copying operation is disabled.

If the switch 161 is OFF, and the switch 162 is ON, the display means 262 indicates the reduction copy. A motor driving voltage VE is set in the motor drive-control circuit 250, and the delay time TE is set in the timer 250'. Then, the copying operation can be effected. The original carriage 218 moves forwardly at a speed corresponding to the reduction copy. The timing roller 253 is actuated after the delay time TE has elapsed from the start of the original carraige 218, so that the leading end of the image on the photosensitive member and the leading end of the copy paper are substantially aligned with each other at the transfer station.

If the switch 161 is ON, and the switch 162 is ON, the display means 262 indicates the unit magnification, or one-two-one copy. A motor driving voltage VQ is set in the circuit 250, and the delay time TQ is set in the circuit 250'. When the copying operation starts, the original carriage 218 is moved forwardly at a speed corresponding to the unit magnification. The timing roller 253 is actuated after the delay time TQ has elapsed from the start of the original carriage 218, so that the leading edge of the original image on the photosensitive member and the leading edge of the copying paper are substantially aligned.

If the switch 161 is ON, and switch 162 is OFF, the display means 262 indicates the enlargement copy. A motor driving voltage VR is set in the circuit 250, and a delay time TR is set in the circuit 250. When the copying operation starts, the original carriage 218 is moved forwardly at a speed corresponding to the enlargement copy. The timing roller 253 is actuated after the delay time TR has elapsed from the start of the original carriage 218, so that the leading edge of the original image on the photosensitive member and the leading edge of the copy paper are aligned.

Although the foregoing description has been made with respect to the case where three magnifications, i.e., the unit magnification, one reduction and one enlargement are usable, but this is not limiting. Also, the described means and manners are not limiting with respect to the means for detecting the magnification when the optical assembly is set in the apparatus, the configuration or contour of the light blocking plate, the number thereof, the driving mechanisms, but another one may be used provided that they are functionally similar. In place of changing the rotational speed of the original carriage motor 251, the rotating speed of the photosensitive member drive motor 252 may be changed in accordance with the imaging magnification of the optical assembly being set in the apparatus.

As for the imaging element array contained in the optical assembly, a plurality of small-diameter imaging elements are arranged in one row or plural rows in the direction transverse with the optical axes of the imaging elements are usable, such as those disclosed in the U.S. patents mentioned hereinbefore.

While the invention has been described with reference to the structures disclosed herein, it is not confined to the details set forth and this application is intended to cover such modifications or changes as may come within the purposes of the improvements or the scope of the following claims.

What is claimed is:

1. A copying apparatus, comprising:
   means for moving an original to be copied;
   means for illuminating the original;
   a photosensitive member movable through an exposure station wherein said photosensitive member is exposed to an image of the original and an image transfer station having transferring means;
   means for feeding a transfer material toward said transfer station;
   an optical assembly for forming a light image of the original on said photosensitive member, wherein said optical assembly includes a plurality of small imaging elements arranged in a direction transverse with the optical axes of said imaging elements;
   means for detachably supporting said optical assembly; and
   means for detecting an imaging magnification of said supported optical assembly.

2. An apparatus according to claim 1, further comprising means responsive to said detecting means to display information of the imaging magnification.

3. An apparatus according to claim 1, further comprising means responsive to said detecting means to change a condition of a copying operation, corresponding to said supported optical assembly.

4. An apparatus according to claim 1, further comprising means responsive to said detecting means to drive said photosensitive member at a speed corresponding to said supported optical assembly, and means responsive to said detecting means to actuate said transfer material feeding means at a timing corresponding to said supported optical assembly.

5. An apparatus according to claim 1, further comprising means responsive to said detecting means to drive said original moving means at a speed corresponding to said supported optical assembly, and means responsive to said detecting means to actuate said transfer material feeding means at a timing corresponding to said supported optical assembly.

6. An apparatus according to any one of claims 1-5, further comprising means for detecting whether said optical assembly is placed at a predetermined position in said apparatus, and means responsive to said positioning state detecting means to display whether said optical assembly is mounted at the predetermined position in said apparatus.

7. An apparatus according to any one of claims 1-5, further comprising means for detecting whether said optical assembly is placed at a predetermined position in said apparatus, and means responsive to said positioning state detecting means to disable the copying operation of said apparatus when said optical assembly is not mounted at the predetermined position in said apparatus.

8. An apparatus according to claim 7, further comprising means responsive to said positioning state detecting means to display whether said optical assembly is mounted at the predetermined position in said apparatus.

9. An apparatus according to any one of claims 1-5, wherein said supporting means is capable of supporting said optical assembly in a first manner such that a first face of said optical assembly is opposed to the original, while a second face thereof is opposed to said photosensitive member, and in a second manner such that the first face is opposed to said photosensitive member, while the second face is opposed to the original, wherein the imaging magnification in the second manner is the reciprocal of the magnification in the first manner.

10. An apparatus according to claim 9, further comprising means for detecting whether said optical assembly is placed at a predetermined position in said apparatus, and means responsive to said positioning state detecting means to display whether said optical assembly is mounted at the predetermined position in said apparatus.

11. An apparatus according to claim 9, further comprising means for detecting whether said optical assembly is placed at a predetermined position in said apparatus, and means responsive to said positioning state detecting means to disable the copying operation of said apparatus when said optical assembly is not mounted at the predetermined position in said apparatus.

12. An apparatus according to claim 11, further comprising means responsive to said positioning state detecting means to detect whether said optical assembly is mounted at the predetermined position in said apparatus.

13. An optical assembly for forming a light image of an original and capable of being detachably supported in a copying apparatus which comprises means for moving the original to be copied, means for illuminating the original, a photosensitive member movable through an exposure station wherein the photosensitive member is exposed to the light image of the original, a developing station having developing means and an image transfer station having transferring means, means for feeding transfer material toward the image transfer station, means for detachably supporting said optical assembly, and means for detecting the imaging magnification of said optical assembly supported by the supporting means, said optical assembly comprising:

an optical member having a plurality of small imaging elements arranged in a direction transverse with the optical axes of said small imaging elements; and means, formed in accordance with the imaging magnification of said optical assembly, for acting on the detecting means when said optical assembly is supported by the supporting means.

14. An assembly according to claim 13, wherein said optical assembly is provided with a first engaging portion for engaging with the supporting means in a manner such that a first face of said optical assembly is opposed to the original, while a second face is opposed to the photosensitive member, and a second engaging portion for engaging with the supporting means in a manner such that the second face of said optical assembly is opposed to the original, while the first face thereof is opposed to the photosensitive member, wherein the imaging magnification of said optical assembly positioned in the second manner is the reciprocal of the magnification of said optical assembly positioned in the second manner.

15. An assembly according to claim 13 or 14, wherein said optical assembly includes means for acting on positioning state detecting means in the copying apparatus.

* * * * *